United States Patent
McKee et al.

(10) Patent No.: US 7,027,840 B2
(45) Date of Patent: Apr. 11, 2006

(54) METHOD AND APPARATUS OF MUTING AN ALERT

(75) Inventors: James Scott McKee, Jacksonville, FL (US); Ruben Rivera, Sunrise, FL (US)

(73) Assignee: Motorola, Inc., Schaumburg, IL (US)

(*) Notice: Subject to any disclaimer, the term of this patent is extended or adjusted under 35 U.S.C. 154(b) by 82 days.

(21) Appl. No.: 10/665,024

(22) Filed: Sep. 17, 2003

(65) Prior Publication Data

US 2005/0059435 A1    Mar. 17, 2005

(51) Int. Cl.
*H04B 1/38* (2006.01)
(52) U.S. Cl. .................. 455/567; 455/550.1; 455/90.3
(58) Field of Classification Search ................ 455/567, 455/550.1, 334, 228, 212, 90.3; 340/825.44, 340/825.46, 7.32
See application file for complete search history.

(56) References Cited

U.S. PATENT DOCUMENTS

| | | | | |
|---|---|---|---|---|
| 4,885,572 A * | 12/1989 | Iwata et al. | ............... | 340/425.5 |
| 5,404,391 A * | 4/1995 | Wavroch et al. | ............ | 455/567 |
| 5,924,046 A * | 7/1999 | Martensson | .................. | 455/567 |
| 6,032,058 A * | 2/2000 | Higuchi et al. | ............. | 455/567 |
| 6,052,563 A * | 4/2000 | Macko | ....................... | 340/7.54 |
| 6,269,256 B1 * | 7/2001 | Nakamura | .................. | 455/567 |
| 6,278,884 B1 * | 8/2001 | Kim | ......................... | 455/556.1 |
| 6,349,225 B1 * | 2/2002 | Lands et al. | ............. | 455/575.3 |
| 6,424,251 B1 * | 7/2002 | Byrne | ....................... | 340/7.58 |
| 6,823,199 B1 * | 11/2004 | Gough | ....................... | 455/567 |
| 6,983,169 B1 * | 1/2005 | Vogel et al. | ............. | 455/550.1 |
| 6,934,547 B1 * | 8/2005 | Suzuki | ....................... | 455/441 |
| 2002/0010008 A1 * | 1/2002 | Bork et al. | ................. | 455/567 |
| 2002/0028662 A1 * | 3/2002 | Yoshinaga | .................. | 455/566 |
| 2002/0137552 A1 * | 9/2002 | Cannon et al. | ............ | 455/567 |
| 2003/0045265 A1 * | 3/2003 | Huang et al. | ............. | 455/219 |
| 2003/0064762 A1 * | 4/2003 | Tanabe et al. | ............. | 455/575 |
| 2004/0132426 A1 * | 7/2004 | Baiker | ....................... | 455/403 |
| 2004/0179694 A1 | 9/2004 | Alley | | |
| 2004/0203500 A1 * | 10/2004 | Wong et al. | ............. | 455/550.1 |
| 2005/0018834 A1 * | 1/2005 | Furnas | .................. | 379/376.02 |
| 2005/0079831 A1 * | 4/2005 | Ramachandran | ........... | 455/90.3 |

\* cited by examiner

*Primary Examiner*—Joseph Feild
*Assistant Examiner*—Kamran Afshar
(74) *Attorney, Agent, or Firm*—Randall S. Vaas (57) ABSTRACT

A wireless communication device (100, 800) is provided with a movement sensor (802), and circuitry for controlling the operation of the wireless communication device. In operation in response to detecting predetermined movement of the wireless communication device, an alert (212) that was previously activated to alert a user to an incoming wireless communication is muted.

13 Claims, 7 Drawing Sheets

METHOD AND APPARATUS OF MUTING AN ALERT

BACKGROUND OF THE INVENTION

1. Field of the Invention

The present invention relates in general to portable communication devices. More particularly, the present invention relates to user control of the operation of portable communication devices.

2. Description of Related Art

Wireless communication devices have become a ubiquitous fixture in society. Owing to their portability wireless communication devices such as cellular telephones are commonly carried by their owners throughout the day as they move from location to location. People tend to leave there cellular telephones on all the time so as not to miss incoming telephone calls, in spite of the fact that at times they are in locations, or social situations, that are not appropriate for receiving telephone calls. For example, calls may be received during important meetings in which the user does not want to be distracted, or while the user is attending a performance where the ringing of the telephone and subsequent conversation would disturb others. At such inopportune times, in order to stop the ringing of the telephone the user must actually reach for the telephone, which might take a few rings if the telephone is somewhere in a coat pocket, or large purse, and then operate a button to mute the ringer, or answer the call. If the user is not very familiar with the telephone or the telephone is difficult to operate, then the user will have to look at the telephone, consuming more time, in order to determine which button sequence to press in order to answer the call or mute the ringer.

What is needed is a method and apparatus that enables a telephone ringer to be muted much more expeditiously to reduce the distraction to the user and others in the vicinity of the user.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
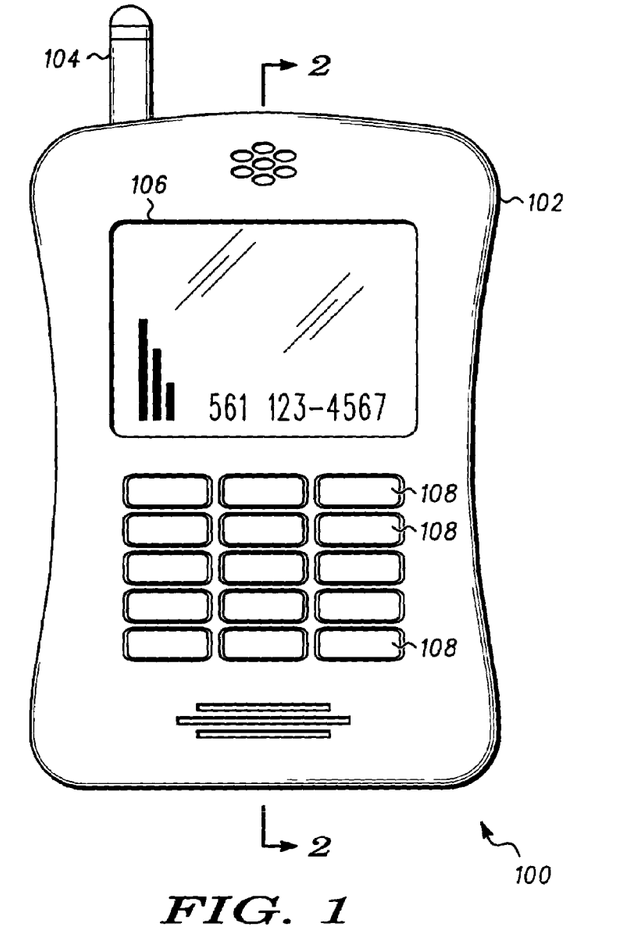
FIG. 1 is a front view of a wireless communication device.
Figure 2:
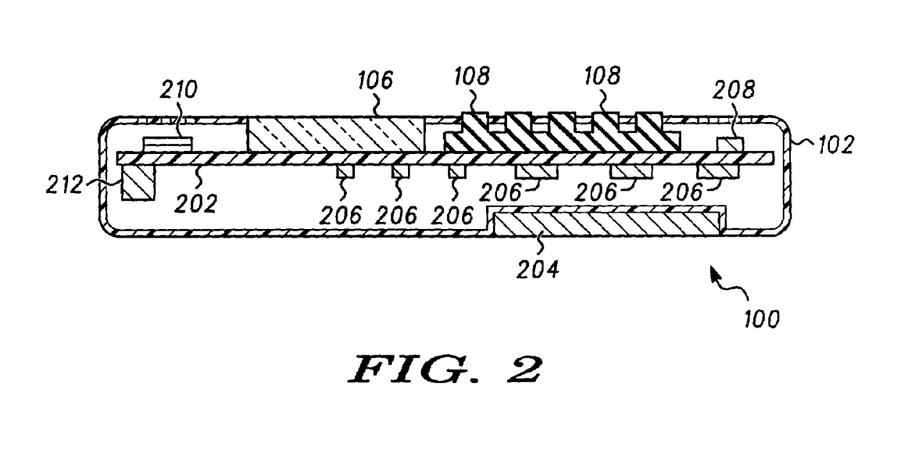
FIG. 2 is a cross sectional side view of the wireless communication device shown in FIG. 1.

FIG. 1 is a front view of a wireless communication device 100 and FIG. 2 is a cross sectional side view of the wireless communication device 100 shown in FIG. 1. The wireless communication device 100 comprises a housing 102 that mechanically couples a plurality of components including an antenna 104, a display 106, a keypad 108, a circuit board 202, and a battery 204. The illustrated device is a wireless telephone, but it will be recognized it may be a pager, cellular telephone, cordless telephone, personal digital assistant, or any other device having an audible alert.

The circuit board 202 supports and electrically interconnects a plurality of components including electrical circuit components 206 that comprise communication and control circuits of the wireless communication device 100, a microphone 208, a speaker 210, and a dual mode alert 212. The dual mode alert 212 is capable of vibrating or emitting an audible beep or melody depending on the nature of a driving signal that is applied. The dual mode alert may be implemented using any suitable vibrator, speaker, piezo transducer, or the like, or a combination thereof.

Figure 3:
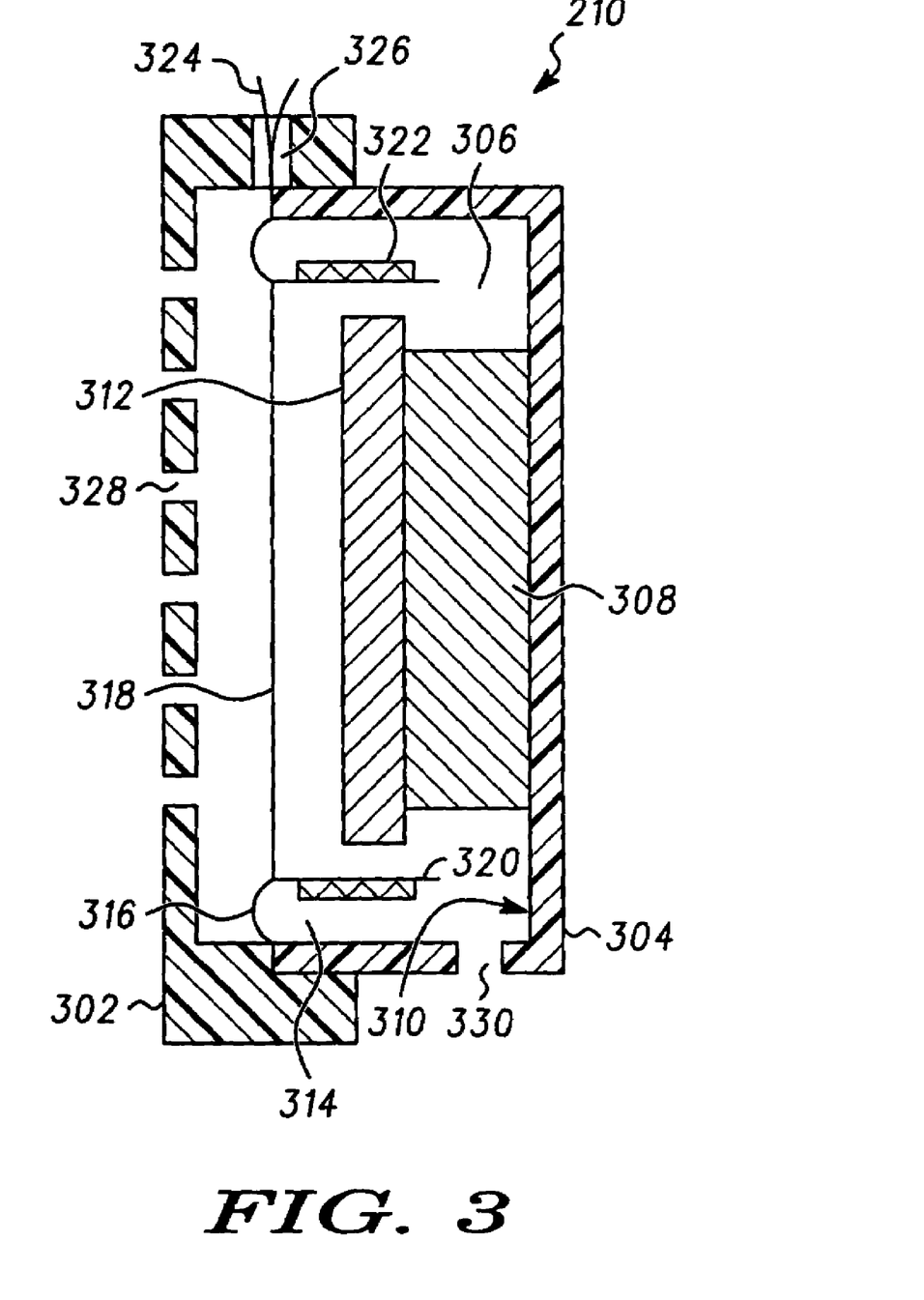
FIG. 3 is a cross sectional view of a speaker used in the wireless communication device shown in FIGS. 1–2.

FIG. 3 is a cross sectional view of the speaker 210 that may be advantageously employed in the wireless communication device shown in FIGS. 1–2. The speaker 210 comprises an upper, generally basket shaped housing part 302, fitted over a lower generally basket shaped housing part 304, so as to form a chamber 306 there between. A permanent magnet 308 is supported on a flat internal bottom surface 310 of the lower housing part 304 and is centered with respect to the lower housing part 304. A ferromagnetic pole piece 312 is supported on the permanent magnet 308. The lower housing part 304 is preferably also ferromagnetic. A magnetic field established by the permanent magnet 308 crosses an annular gap 314 between the pole piece 312 and the lower housing part 304.

A resilient annular suspension member 316 is secured between the upper 302, and lower 304 housing parts. The suspension member 316 suspends a diaphragm 318 across the chamber 306. The suspension 316 also supports a cylindrical bobbin 320, on which is wound a voice coil 322. The bobbin 320 and voice coil 322 are suspended concentrically in the annular gap 314. Leads 324 of the voice coil 322 pass over the suspension 316 and out of the speaker 210 through an electrical access opening 326.

The upper housing part 302 includes a plurality of frontal openings 328 that allow acoustic energy generated by the diaphragm 318 to propagate out of the speaker 210. The lower housing part 304 also includes one or more openings 330 to avoid the development of back-pressure behind the diaphragm 318.

Application of audio electrical signals to the leads 324 generates commensurate Lorentz forces on the voice coil 322, that causes commensurate movement of the bobbin 320 and the diaphragm 318. The movement successively compresses and rarifies air adjacent to the diaphragm 318 thereby generating sound waves according to the audio electrical signals. Thus, as is known, the speaker 210 acts as a transducer for converting audio electric signals to sound.

The speaker 210 also performs another function. In particular the speaker 210 is used to detect movement of the wireless communication device 100, such as occurs when the wireless communication device 100 is deliberately tapped by a user. When the wireless communication device 100 is tapped, due to inertia, the bobbin 320 and voice coil 322 tend to stay fixed, and consequently move relative to the pole piece 312, and lower housing part 304. Thereafter, the bobbin 320, and voice coil 322 will oscillate back and forth with a decaying amplitude. Consequently, due to the Lorentz force, a decaying oscillatory transient voltage is induced in the voice coil 322. The voltage induced in the voice coil 322 as a result of movement of the wireless communication device 100 appears in the form of an electrical signal between the leads 324, and the electrical signal is used to detect movement of the wireless communication device 100.

The movement that is to be detected is that caused by a deliberate tapping or striking of the wireless communication device 100 by the user. The speaker 210 is more sensitive to strikes directed parallel to the axis of the voice coil 322. Accordingly, users tapping the front or back of the wireless communication device 100 may produce the stronger signals on leads 324 than forces acting in other directions.

Figure 4:
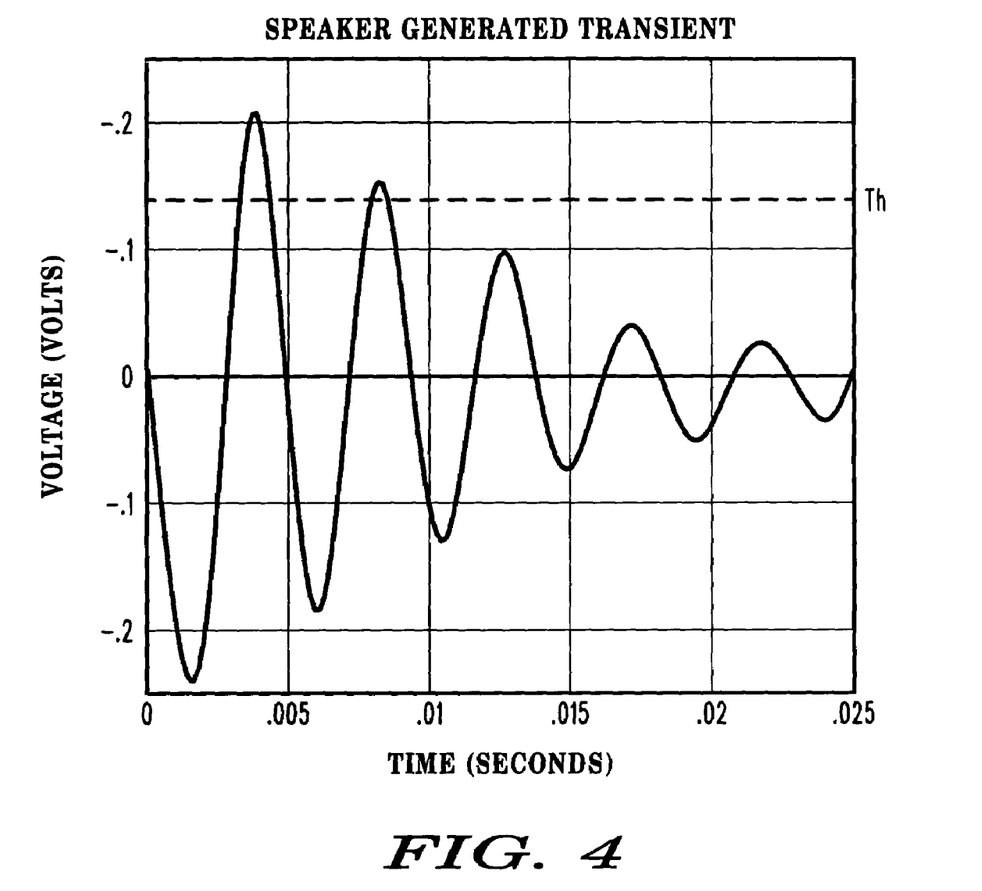
FIG. 4 is a trace of a transient signal generated by the speaker shown in FIG. 3 acting as a movement sensor.

FIG. 4 is a trace of a transient signal generated by a speaker, acting as a movement sensor, in response a user striking the housing of the wireless device. The trace shown in FIG. 4 was generated by measuring the signal produced by a speaker supported in a wireless communication device when the housing of the wireless communication devices was tapped by a user. As shown in FIG. 4 the speaker generated an approximately exponentially decaying oscillation. The amplitude of the transient signal can be compared to a threshold Th in order to distinguish a deliberate tapping on the wireless communication device from ordinary movement of the device.

Figure 5:
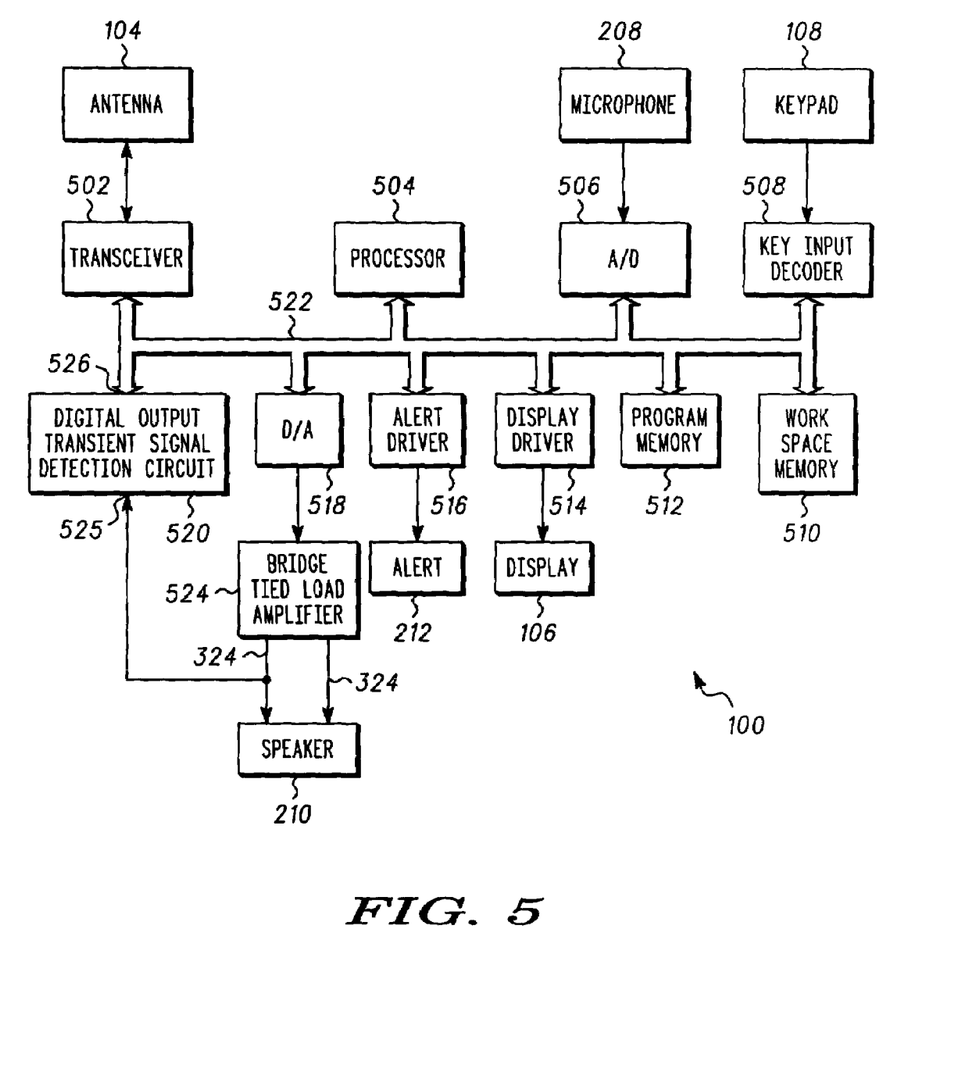
FIG. 5 is a functional block diagram of the wireless communication device shown in FIGS. 1–2.

FIG. 5 is a functional circuit diagram in block form of the wireless communication device 100 shown in FIGS. 1–2. As shown in FIG. 5 the wireless communication device 100 comprises a transceiver 502, a processor 504, an analog-to-digital converter (A/D) 506, a key input decoder 508, a work space memory 510, a program memory 512, display driver 514, an alert driver 516 a digital-to-analog converter (D/A) 518, and a digital output transient signal detection circuit 520 coupled together through a signal bus 522.

The transceiver module 502 is coupled to the antenna 104. Carrier signals that are modulated with data, e.g., audio data, pass between the antenna 104, and the transceiver 502.

The microphone 208 is coupled to the A/D 506. Audio, including spoken words, is input through the microphone 208 and converted to digital format by the A/D 506.

The keypad 108 is coupled to the key input decoder 508. The key input decoder 508 serves to identify depressed keys, and provide information identifying each depressed key to the processor 504.

The D/A 518 is coupled through a bridge tied load amplifier 524 to the speaker 210. The D/A 518 converts decoded digital audio to analog signals and drives the speaker 210 through the amplifier 524. The display driver 514 is coupled to the display 106.

The alert driver 516 drives the alert 212. The alert 212 is activated when wireless communication signals (e.g., a wireless telephone call, or a wireless text message) are received by the wireless communication device 100, in order to draw the user's attention to the received wireless communication signals.

The program memory 512 is used to store programs that control the wireless communication device 100. The programs stored in the program memory 512 are executed by the processor 504. The memory may be implemented using static memory, dynamic memory, or a combination of static and dynamic memory. The processor may be implemented using a microprocessor, a controller, a programmable logic unit, a digital signal processor, discrete logic circuitry, or the like.

At least one of the leads 324 of the speaker 210 is also coupled to an input 525 of the digital output transient signal detection circuit 520. The transient signal detection circuit 526 is used to detect signal transients generated by the speaker 210 when the wireless communication device 100 is deliberately moved or tapped by the user. When a transient signal caused by movement is detected, a digital output 526 of the transient signal detection circuit 520 goes to a predetermined state, e.g., logical high, or logical low. The predetermined signal state at the digital output 526 of the detection circuit 520 is maintained until the detection circuit 520 is reset by the processor 504, or alternatively is maintained for a predetermined interval that provides sufficient time for the digital output 526 of the detection circuit 520 to be read by the processor 504. The digital output 526 of the detection circuit 520 and any control terminals of the detection circuit 520 are coupled to the processor 504 through the signal bus 522.

Figure 6:
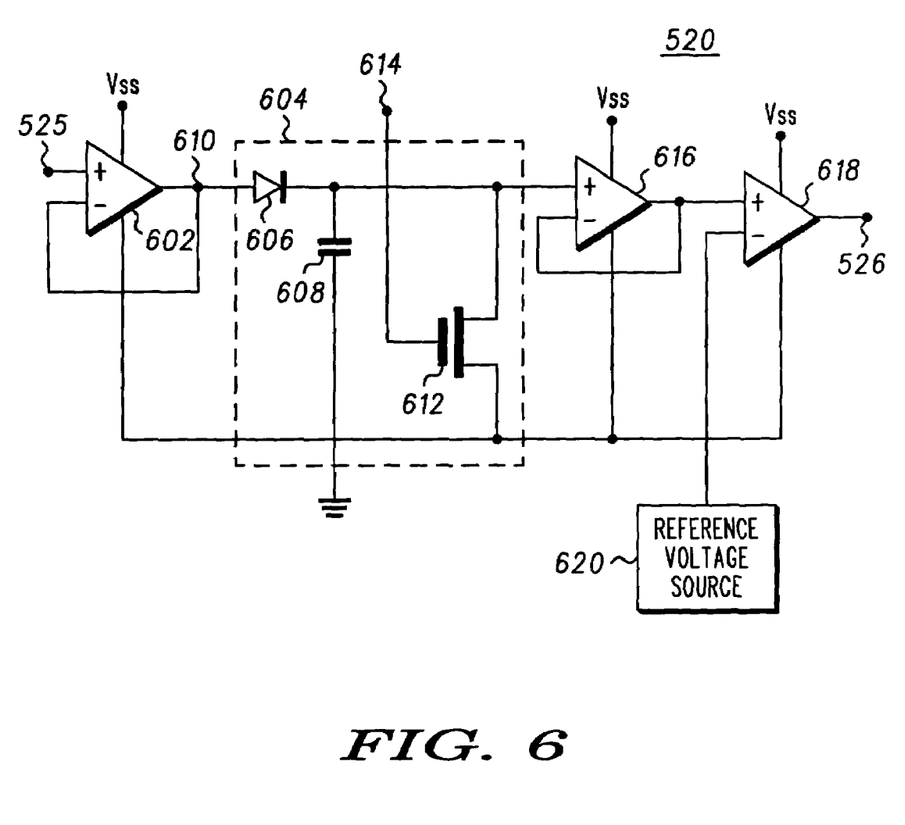
FIG. 6 is a circuit schematic of a digital output transient signal detection circuit included in the wireless communication device shown in FIGS. 1,2, 5.

Although the invention should not be construed as limited to any particular design of the digital output transient signal detection circuit 520, an exemplary design is shown in FIG. 6. Referring to FIG. 6, a first buffer 602 buffers the input 525 of the detection circuit 520. The first buffer 602 is coupled to a peak hold circuit 604. The peak hold circuit 604 comprise a diode 606, and capacitor 608 coupled between an output 610 of the first buffer 602, and ground. A transistor 612 serving as reset switch is connected across the capacitor 608, for selectively discharging the capacitor 608 in order to reset the peak hold circuit 604. A junction of the diode 606, capacitor 608, and transistor 612 serves as an output of the peak hold circuit 604. A gate terminal 614 of the transistor is coupled to the signal bus 522 allowing the processor 504 to reset the peak hold circuit 604. The output of the peak hold circuit 604 is coupled through a second buffer 616 to a comparator 618. A reference voltage source 620 which can for example comprise a diode, or a resistive voltage divider is also coupled to the comparator 618. The output of the comparator 618 serves as the output 526 of the digital output transient detection circuit 520.

In operation, when a communication signal (e.g., wireless telephone call) is received the peak hold circuit 604 is reset by momentarily switching on the transistor 612 in order to discharge the capacitor. Thereafter the transistor 612 is switched to a nonconducting state, allowing the peak output of the first buffer 602 to be stored on the capacitor 608, and the alert 212 is activated. Movement of the speaker 210 in the wireless communication device 100 will, as previously described, generate transient signals that will be coupled though the first buffer 602, through the diode 606 of the peak detector circuit 604 to the capacitor 608. The peak signal level, which is stored on the capacitor 608, will be coupled through the second buffer 616 to the comparator 618. When the movement of the wireless communication device 100 is sufficient to generate a peak voltage on the capacitor 608 that exceeds a predetermined level that is set by the reference voltage source 620, the comparator 618 output will go to a high logic level. The processor 504 will then respond to the high output of the comparator by muting the alert 212.

The comparator 618 serves to distinguish relatively higher amplitude signals caused by a deliberate tap, from lower level signals that may be generated in normal movement of the wireless communication device carried by the user. It will be recognized by those skilled in the art the a visual alert may be optionally generated on display 106 informing the user of the incoming call alert, even after the audible alert is muted. If used, such visual notice will reassure the user that the incoming call has not been disconnected, and that the user may still answer the call to complete the connection. Alternatively, the wireless communication device may respond to the sharp movement of the device by disconnecting the call or answering the call. It is envisioned that the choice of maintaining or disconnecting the call may be a user selected option (for example, it may be a menu option pre-selected by the user).

Thus by providing the digital output transient detection circuit for detecting the transient voltage signal generated by the speaker 210 caused by sharp movement (e.g., due to deliberate tapping) of the wireless communication device 100, that movement can be detected and an indication of the movement passed to the processor 504, and the operation of the telephone can be altered.

Figure 7:
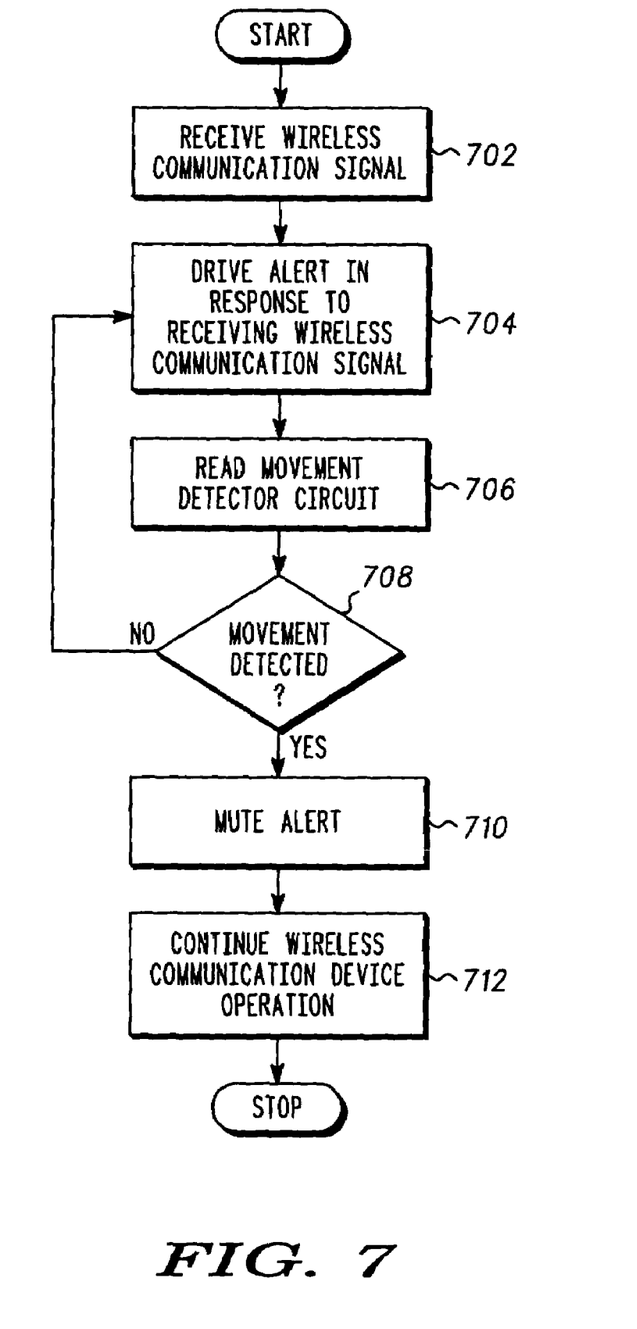
FIG. 7 is a flow chart of a method of operating the wireless communication device shown in FIGS. 1–2, 5.

FIG. 7 is a flow chart of a method of operating the wireless communication device 100 shown in FIGS. 1–2,5. In step 702 a wireless communication signal is received. The wireless communication signal may be a wireless alert signal, a wireless text message signal, or a wireless multimedia message signal. In step 704 in response to receiving the wireless communication signal the alert 212 is activated. In step 706 a movement detection circuit is monitored to determine if the wireless communication device 100 has been subject to a force having a predetermined characteristic (e.g., the device has been tapped). In the case of the embodiment shown in FIG. 6, the output of the comparator 526 is read. It will be appreciated by those skilled in the art that, in the context of the method shown in FIG. 5, rather than using the speaker 210 and digital output transient signal detection circuit 520 to detect movement of the wireless communication device 100, many other types of movement sensors, methods and circuits may be alternatively implemented to detect movement of the wireless communication device. In block 706, the detection circuit may set a processor interrupt of the processor 504 in order to inform the processor 504 that movement has been detected. Block 708 is a decision block, the outcome of which depends on whether movement was detected. If not than the method loops back to step 704, and continues to drive the alert 212. If on the other hand movement was detected, then in step 710 the alert 212 is muted, i.e., turned off. Block 712 represents the continuation of normal wireless communication device control operations (e.g., for conducting voice and data communications). Thus, after tapping the device, the user may move to a location where the device may be answered, or the user may ignore the alert and permit the call to be routed to voice mail. Thus, the user need only tap the wireless communication device, in order to mute the alert, and the call can continue as if the alert was being produced (the calling party need not know that the alert has been muted).

Figure 8:
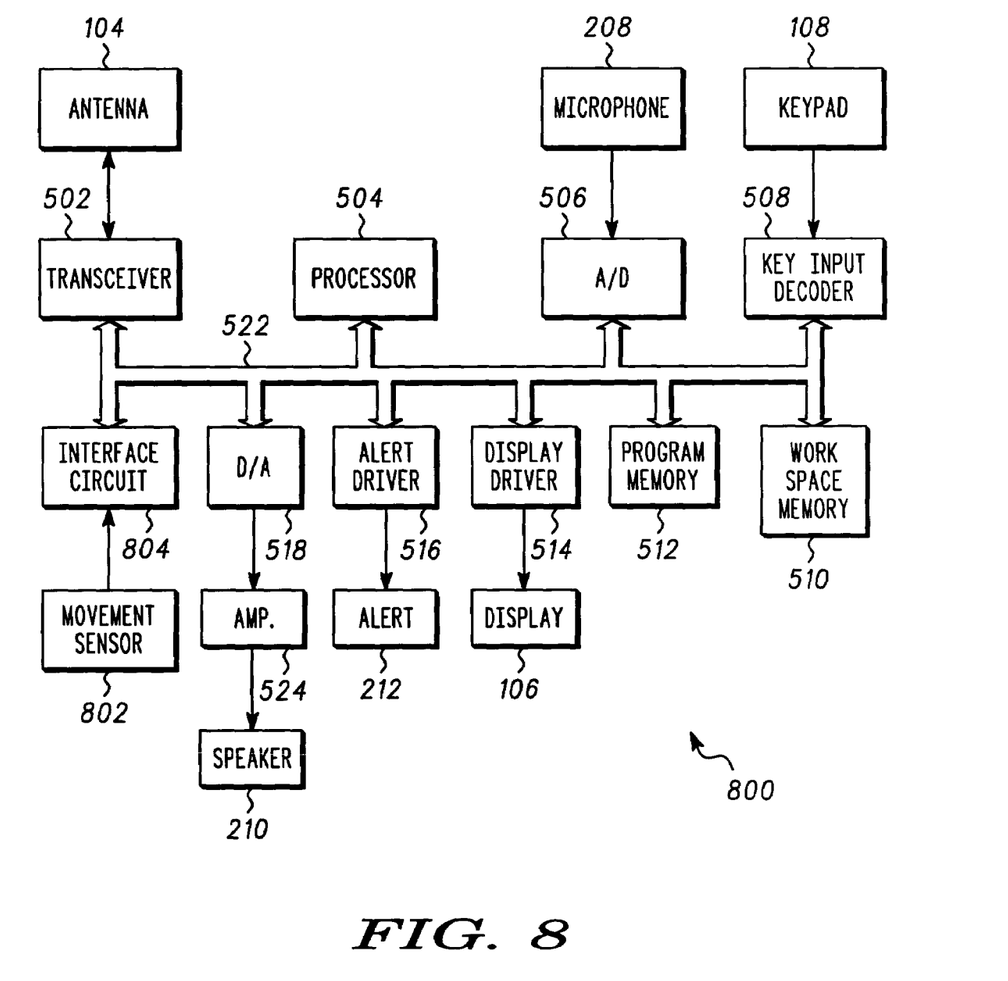
FIG. 8 is a functional block diagram of a wireless communication device.

FIG. 8 is a functional block diagram of a wireless communication device 800. The wireless communication device shown in FIG. 8 includes a dedicated movement sensor 802 that is coupled to the signal bus 522, and in turn the processor 504, through an interface circuit 804. The specific design of the interface circuit 804 is dependent on the nature of the movement sensor 604. The movement sensor 802 can for example comprise a Micro-Electro Mechanical System (MEMS) accelerometer, or a shock sensor such as the type based on moveable ball of mercury that completes a circuit when disturbed by movement. Other types of movement sensors may alternatively be used.

Although an audible alert is described above, it will be recognized that the alert may be a vibrating alert. In such an embodiment, the threshold for muting the alert should be above the level of motion produced by the vibrator. The user can tap the phone at a force exceeding the force of the vibrator to produce a signal above the threshold which results in muting the vibrator. In this embodiment, "mute", "muting" or "muted" means turning the vibrator off.

It will also be recognized that regardless of the type of alert used, the alert may remain disabled for a predetermined period, such as a period ending when the incoming call is terminated, when a timer expires, or when the user manually reactivates the alert either by tapping the device housing again or operates the menu.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A wireless communication device comprising:
   an alert;
   a speaker;
   an electrical circuit coupled to the alert and the speaker, the electrical circuit operable to generate an electrical signal in response to the speaker detecting movement of the wireless communication device,
   and the electrical circuit adapted to receive wireless communication signals, activating the alert in response receiving wireless communication signals, and mute the alert in response to the electrical signal exceeded a threshold level.

2. The wireless communication device according to claim 1 wherein:
   the speaker comprises a voice coil, including at least one lead.

3. The wireless communication device according to claim 2 wherein:
   the electrical circuit comprises a comparator including an output, and one or more inputs coupled to the at least one lead.

4. The wireless communication device according to claim 3 wherein the electrical circuit comprises:
   a peak hold circuit coupled between the at least one lead and the comparator.

5. The wireless communication device according to claim 1 wherein:
   the alert comprises an audible alert.

6. The wireless communication device according to claim 4, further including;
   a microprocessor coupled to the output of the comparator; and
   an alert driving circuit coupled to the microprocessor.

7. A method of operating a wireless communication device comprising:
- receiving a wireless communication signal;
- activating an alert in response to receiving the wireless communication signal;
- detecting movement of the wireless communication device by detecting a signal level on a speaker;
- comparing the signal level on the speaker element to a threshold value; and
- in response to the signal level exceeding the threshold value, muting the alert.

8. The method of operating a wireless communication device according to claim 7 wherein activating the alert comprises:
- activating an audible alert.

9. A wireless communication device comprising:
- a housing;
- an alert;
- a speaker carried in the housing; and
- an electrical circuit coupled to the alert and the speaker, the electrical circuit responsive to an electrical signal generated in response to an element of the speaker being moved by a force impacting the housing, and further operable to receive wireless communicating signals, activate the alert in response receiving a wireless communication signal for activating the alert, and mute the alert in response to the electrical signal exceeding a threshold.

10. The communication device according to claim 9, wherein the electrical circuit includes a comparator, the comparator detecting when the electrical signal on the speaker exceeds the threshold.

11. The communication device according to claim 9, wherein the electrical circuit includes a peak hold circuit coupled to at least one lead of the speaker and a comparator coupled to the peak hold circuit.

12. A wireless communication device comprising:
- a housing;
- an alert;
- a detector carried in the housing to detect movement of the housing; and
- an electrical circuit coupled to the alert and the detector, the electrical circuit operable to receive wireless communicating signals, activate the alert in response receiving a wireless communication signal for activating the alert, and mute the alert in response to an electrical signal from the detector exceeding a threshold, wherein the electrical circuit includes a peak hold circuit coupled to the detector and a comparator coupled to the peak hold circuit for detecting when the electrical signal exceeds the threshold.

13. The wireless communication device according to claim 12, wherein the detector is a speaker.

* * * * *